T. DIEBOLD, Jr.
Manufacture of Jewellers' Stock.
No. 133,835.  Patented Dec. 10, 1872.
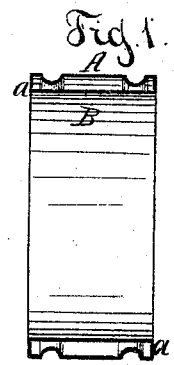
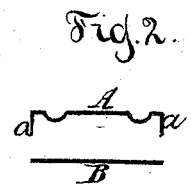
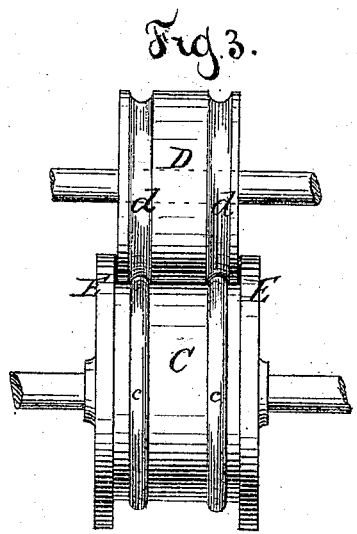
Witnesses.
C. Wahlers.
Ernst Bilhuber.
Inventor.
Theodore Diebold
By Van Santvoord & Hauff
his atty

UNITED STATES PATENT OFFICE.

THEODORE DIEBOLD, JR., OF NEW YORK, N. Y.

IMPROVEMENT IN THE MANUFACTURE OF JEWELERS' STOCK.

Specification forming part of Letters Patent No. 133,835, dated December 10, 1872.

*To all whom it may concern:*

Be it known that I, THEODORE DIEBOLD, Jr., of the city, county, and State of New York, have invented certain new and useful Improvements in Jewelers' Stock and rolls for manufacturing the same, of which the following is a specification:

In the drawing, Figure 1 is an elevation of a bracelet made from my improved jewelers' stock. Fig. 2 is a cross-section of my improved jewelers' stock, the same adapted to the manufacture of bracelets, the bottom plate being detached; and Fig. 3 represents rollers by means of which I am enabled to groove or ornament the stock while forming the plate with the end pieces.

This invention has for its object to form a new and improved article known to the trade as jewelers' stock, designed especially for the manufacture of bracelets, whereby a bracelet is made stronger and at less cost.

The stock heretofore used by jewelers in the manufacture of bracelets necessitated the employment of four separate pieces and four joints. The necessity of such construction was due to the fact that there was no method known whereby the stock or top plate could be ornamented or grooved, unless such stock were plain or flat, as the plates were grooved by means of rollers, between which they were passed, and no construction of rollers was known that would operate on plates of irregular shape. Therefore the top plate was rolled and grooved, and the end plates or strips were made separate and afterward soldered to the edges of the top plate.

My improvement consists in producing a new form of jewelers' stock designed especially for use in manufacture of bracelets, the same consisting in making the top plate and end pieces in one piece, the ends projecting down at right angles with the top so as to receive the edges of a bottom plate, to which they are soldered, thereby requiring only two joints to unite the plates.

In order to enable me to groove and ornament the top plate with its ends projecting downward in this manner, I have adopted the following method, which composes part of my invention.

I form vertical flanges on the ends of the male roller, by means of which the top plate is grooved and arranged thereon, so that the vertical end of the top plate can pass between them and the ends of the female roller, thereby allowing the periphery of the top to be acted on and its grooves perfected without injury to the ends from their passage through the rollers. The faces of the rollers are so constructed and set that they take hold of the top plate between the convex and concave portions of their faces by which the grooves are produced, and thus I preserve the plate from being changed in curvature by the operation of the rollers.

Fig. 1 shows a bracelet made from the improved stock according to my invention, the same being shown in longitudinal section, the letter A designating the top plate with its vertical ends *a* formed in one piece with it, and B the bottom plate.

Fig. 2 illustrates the top and bottom plates detached from each other. These plates are soldered to each other at the points where the vertical ends meet the edges of the bottom plate.

Fig. 3 represents a pair of rollers, C D, suitable for grooving the top plate, as above explained. The male roller C is provided with vertical flanges E E, which project from its ends so as to overlap the ends of the female roller, the rollers being constructed and set in such a manner that the top plate with the vertical ends can pass between them, as is illustrated in the figure, which shows the top plate between the rollers, the parts of the plate which are held and acted on by the rollers being the parts which come between the convex heads *c* of the male roller and concave depressions *d* of the other roller, the other parts being allowed to pass through without pressure. That portion of the male roller which acts upon the top portion of the plate, in addition to the beads and grooves, may be provided with any desired design or ornamental figure raised upon its surface, while the surface of the female roller will be recessed with corresponding designs or ornamental figures, so as to impart to the said top plate, in its passage between the rolls, a highly-attractive ornamental surface.

Having thus described my invention, what

I claim as new, and desire to secure by Letters Patent, is—

1. As a new article of manufacture, jewelers' stock, consisting of the plate A formed in one piece with the depending end pieces a a, and grooved or ornamented, substantially as herein shown and set forth.

2. The rolls C D, constructed essentially as described, for the purpose of forming the improved "jewelers' stock" herein shown, for the purpose specified.

THEODORE DIEBOLD, Jr.

Witnesses:
J. Van Santvoord,
E. F. Kastenhuber.